United States Patent [19]
Lapper et al.

[11] Patent Number: 6,129,196
[45] Date of Patent: Oct. 10, 2000

[54] COUNTERBALANCED MONO-FOLD STOCKPILING TRAILER CONVEYOR

[76] Inventors: Derek Lapper, 961 Timmins Gardens, Pickering, Ontario; Paschal McCloskey, 38 Cawkers Cove Rd., Port Perry, Ontario, both of Canada

[21] Appl. No.: 09/122,669

[22] Filed: Jul. 27, 1998

[51] Int. Cl.$^7$ .................................................. B65G 15/26
[52] U.S. Cl. ..................... 198/313; 198/316.1; 198/318; 198/632
[58] Field of Search ................................... 198/313, 318, 198/312, 315, 316.1, 632

[56] References Cited

U.S. PATENT DOCUMENTS

| | | | |
|---|---|---|---|
| 4,135,614 | 1/1979 | Penterman et al. | 198/306 |
| 4,427,104 | 1/1984 | Reid, Jr. | 198/313 |
| 5,297,914 | 3/1994 | Ash | 198/313 |
| 5,443,351 | 8/1995 | Pettijohn | 198/632 |

FOREIGN PATENT DOCUMENTS

| | | | |
|---|---|---|---|
| 342238 | 5/1920 | Germany | 198/313 |

*Primary Examiner*—Christopher P. Ellis
*Assistant Examiner*—Khoi H. Tran
*Attorney, Agent, or Firm*—G. F. Gallinger

[57] ABSTRACT

Highway safety regulations generally limit the length of trailers to 75'. Most large conveyors generally have two top folds, one at each end of the conveyor. This format facilitates a trailer which is balanced on a wheeled support both in an unfolded operative position and a folded towing position. The mono-fold trailer conveyor comprises: a main conveyor section having a feed end portion; one and only one folding discharge conveyor section having one end hingably attached to the main conveyor section and having a length exceeding one half of the length of the main conveyor section; and, a counterweight positioned on the feed end portion of the conveyor, necessitated by the otherwise unbalanced folding discharge conveyor section, and sized to stably maintain the discharge end of the conveyor in an elevated position when the conveyor is in an operative unfolded position. With a counterbalanced mono-fold trailer conveyor there is a substantially greater horizontal run between the wheeled support and the discharge end of the conveyor. This means that a mono-fold conveyor can stockpile a substantially greater volume of material than a bi-fold conveyor of similar length without being moved. The mono-fold trailer conveyor is also easier and less costly to manufacture; stronger; and safer to transport, setup and operate; than large trailer conveyors of conventional design.

7 Claims, 1 Drawing Sheet

COUNTERBALANCED MONO-FOLD STOCKPILING TRAILER CONVEYOR

FIELD OF INVENTION

This invention relates to portable belt conveyors which can be towed behind a vehicle and backed into position. More particularly this invention relates to a novel design for large trailer conveyors which must be towed in a folded position.

BACKGROUND OF THE INVENTION

Highway safety regulations generally limit the 10 length of trailers to 75'. Most large conveyors unfold to 100 or 120' in length. Generally they have two top folds, one at each end of the conveyor. To maximize maneuverability the conventional trailer conveyor is supported by a singular wheeled support. For safe towing and stable operation the conventional trailer must be supported just behind its longitudinal center of gravity. The upper and lower portions of the conveyor, of generally equal length and weight, are hinged to the end portions of the trailer so that the center of gravity does not shift along the length of the conveyor when the conveyor is unfolded from a towing position to the operative position.

U.S. Pat. No. 4,135,614 issued to L. F. Penterman is for an improvement on this conventional trailer conveyor. The improvement comprises a wheeled support which allows for both longitudinal motion and lateral movement of the conveyor in an arc about its material loading point. This allows more material to be stockpiled without moving the conveyor.

Canadian Patent No. 1,057,224 issued to T. J. Johannsen is for a large side folded trailer conveyor. The trailer has a singular wheeled support under its rear central portion. However, unlike the conventional trailer in which the upper and lower end portions swing upwardly, in this trailer the two end portions swing laterally outward, and then into position. The need for two unfolding actuating mechanisms is eliminated. However, two folded sections, and two hinges are employed. The hinges are expensive to manufacture, structurally weak, and a source of operating problems. And as with Penterman's trailer the amount of material which can be stockpiled without moving the trailer, is limited by the stockpiled material approaching the wheeled support of the trailer on the ground. What is needed is not a longer conveyor, but a conveyor having a greater longitudinal extension cantilevered above its point of wheeled support on the ground.

OBJECTS AND STATEMENT OF INVENTION

It is an object of this invention to disclose a mono-fold trailer conveyor which has optimal weight distribution about a single point of support—so that the trailer may be safe in towing and stable in operation. It is an object of this invention to disclose a trailer conveyor which has a disproportionately long upper conveyor section so that an unusually broad stockpile of material may spill thereunder without impeding the trailer's mobility. It is yet a further object of this invention to disclose a trailer conveyor which has an exceptionally high lift so that when this greater lift is combined with its disproportionately long upper conveyor section a disproportionately large amount of material may be stockpiled (beneath the conveyor behind its wheels) without the need to reposition the trailer conveyor. It is a final object of this invention to disclose a conveyor which is easier and less costly to manufacture; stronger; and safer to transport, setup and operate; than large trailer conveyors of conventional design.

One aspect of this invention provides for a mono-fold trailer conveyor for stockpiling material comprising: a main conveyor section having a feed end portion adapted for towing, a central portion, and an intermediate end portion; one and only one folding conveyor section having one end hingably attached to the intermediate end portion of the main conveyor section, and having an opposite discharge end portion, so that in a folded position the folding conveyor section is adjacent to the main conveyor section, and in an operative unfolded position it linearly extends the main conveyor section, said folding conveyor section having a length exceeding one half of the length of the main conveyor section; a continuous driven belt encircling the conveyor sections; a wheeled support having a frame, a telescoping arm having one end portion hinged to the frame and an opposite end portion hinged to the intermediate end portion of the main conveyor section, and a fixed length arm having one end hinged to the frame and an opposite end hinged to the central portion of the main conveyor section, so that when the telescoping arm is in a retracted position the main section of the conveyor is in a generally horizontal position and when the telescoping arm is in an extended position the intermediate end portion is elevated and the main conveyor section is inclined; and, a counterweight positioned on the feed end portion of the conveyor, necessitated by the otherwise unbalanced folding conveyor section, and sized to stably maintain the discharge end of the conveyor in an elevated position when the conveyor is in an operative unfolded position.

Another aspect of this invention provides for a trailer conveyor as above wherein the folding conveyor section unfolds in a vertical plane, and further comprises a hydraulic lifting means for the unfolding thereof.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 3:
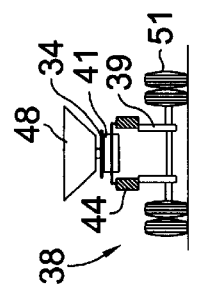
FIG. 3 is an end view of the trailer conveyor taken along line 3—3 in FIG. 1.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 1:
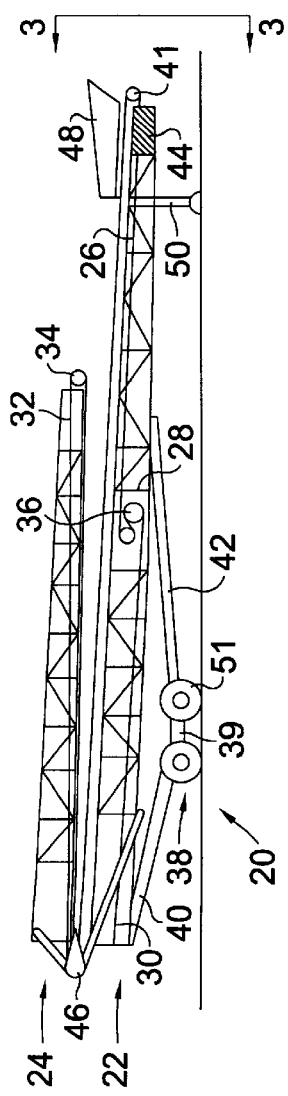
FIG. 1 is a perspective view of a mono-fold trailer conveyor in a folded towing position.

Turning now to the drawings and more particularly to FIG. 1 we have a perspective view of a mono-fold trailer conveyor 20 in a folded towing position. The mono-fold trailer conveyor 20 comprises: a main conveyor section 22 which has a feed end portion 26 adapted for towing, a central portion 28, and an intermediate end portion 30; as well as a folding discharge conveyor section 24. The folding conveyor section 24 has a discharge end portion 32 and an opposite end portion which is hingably attached to the intermediate end portion 30 of the main conveyor section 22. The folding conveyor section 24 unfolds through a vertical plane, and a hydraulic lifting means 46 for the unfolding is provided. The folding conveyor section 24 has a length exceeding one half of the length of the main conveyor section 22. When in a folded position the folding conveyor section 24 is adjacent to the main conveyor section 22, and when in an operative unfolded position (see FIG. 3) the folding conveyor section 24 linearly extends the main conveyor section 22.

Figure 2:
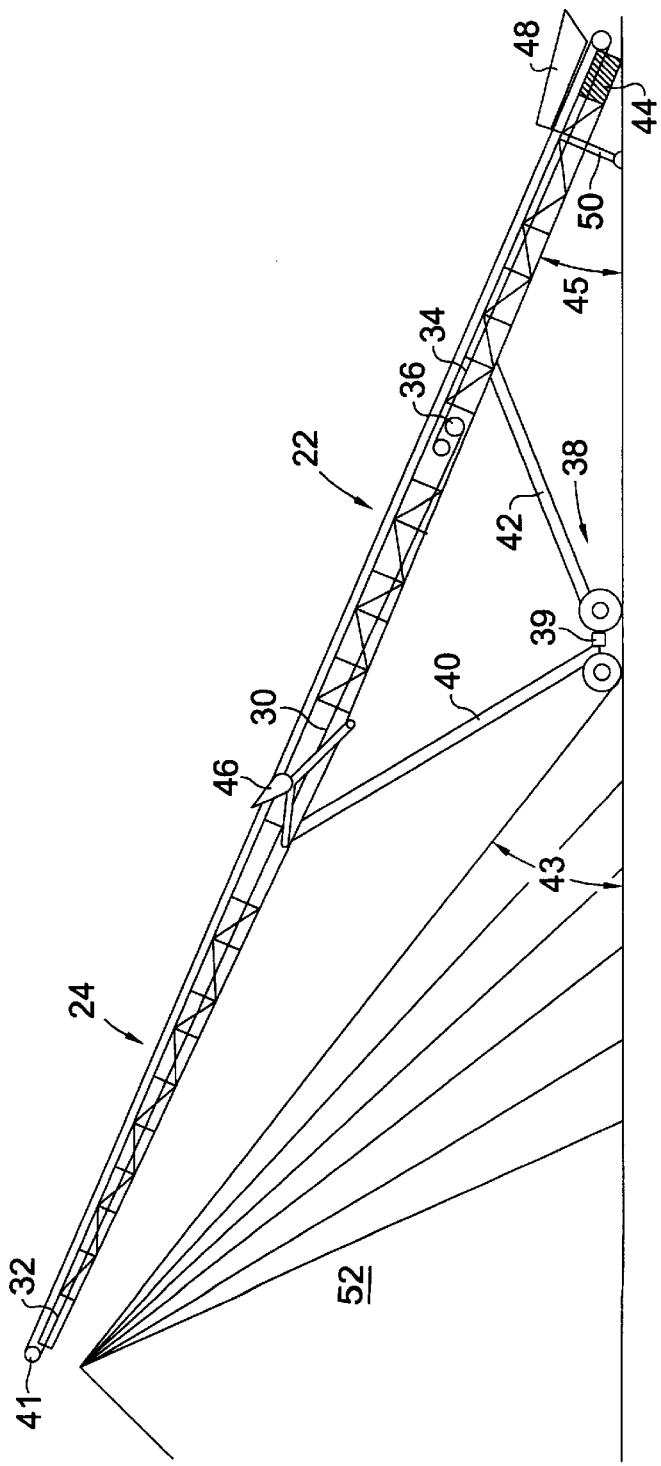
FIG. 2 is an elevational view of the mono-fold trailer conveyor in an unfolded operational position.

FIG. 2 is an elevational view of the mono-fold trailer conveyor 20 in an unfolded operative position. Referring now to FIGS. 1 and 2 observe continuous belt 34, driven by drive 36, encircles the conveyor sections 22,24 carried on pulleys 41. A wheeled support means 38 has a frame 39, a telescoping arm 40 and a fixed length arm 42. The telescoping arm 40 has one end portion hinged to the frame 39 and an opposite end portion hinged to the intermediate end portion 30 of the main conveyor section 22. The fixed length arm 42 also has one end hinged to the frame 39 and an opposite end hinged to the central portion 28 of the main conveyor section 22.

When the telescoping arm 40 is in a retracted position the main section of the conveyor 22 is in a generally horizontal position and when the telescoping arm 40 is in an extended position, the intermediate end portion 30 is elevated and the main conveyor section 22 is inclined. Thus, the inclination 45 of the conveyor 20 may thus be controlled by the amount of extension of the telescoping arm 40.

Because the folding conveyor section 24 has a length substantially exceeding one half of the length of the main conveyor section 22 a counterweight 44 is required to be positioned on the feed end portion 26 of the conveyor 20. Without this counterweight 44 the conveyor 20 would be unbalanced and fall forward when in the unfolded operative position. The counterweight 44 is sized to stably maintain the discharge end 30 of the conveyor 20 in an elevated position when the conveyor 20 is in the operative unfolded position.

In the most preferred embodiment of the invention a loading hopper 48 is positioned above the feed end portion 26 of the conveyor 20. A hydraulic landing leg 50, positioned under the feed end portion 26 of the conveyor 20 provides support when the conveyor 20 is in a folded position. The leg 50 has an extended length when the telescoping arm 40 is in a retracted position and a shorter length when the telescoping arm 40 is in an extended position. The weight of the trailer conveyor 20 is carried by two pairs of adjacent wheels 51 in tandem on each side of the conveyor 20. FIG. 3, an end view of the trailer conveyor 20 taken along line 3—3 in FIG. 1 best shows these wheels 51.

In the most preferred embodiment of the invention the angle of inclination 52 of the conveyor 20 in the most inclined operative position is generally 22–23 degrees. With this angle of inclination 42 a conveyor 20 of the preferred length of 125' has a rise of 46'. But more importantly the horizontal run between the discharge end portion 32 of the conveyor 20 and the wheeled support means 38 is in generally 62'. This means that the conveyor 20 can produce a conical stockpile 52, 46' high with a base diameter of generally 120'(this assumes an angle of inclination 43 in the conical stockpile 52 of 37 degrees). More generally, a 125' conveyor 20 can stockpile 6500 cubic yards without being shifted.

In the folded position this 125' conveyor 20 is generally 13½' high. The length for highway safety regulations is generally the length of the main conveyor section 22 which is generally 73'. The mono-fold trailer conveyor 20 is able to produce a substantially larger stockpile 52 and concurrently meet the highway safety regulations than substantially longer conventional bi-fold conveyor trailers which are limited by their horizontal run between the discharge end portion 32 of the conveyor 20 and their wheeled support means 38. The mono-fold trailer conveyor 20 is also easier and less costly to manufacture; stronger; and safer to transport, setup and operate; than large trailer conveyors of conventional design (not shown).

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be0 protected is defined by the following claims.

I claim:

1. A mono-fold trailer conveyor for stockpiling material comprising:

a main conveyor section having a feed end portion adapted for towing, a central portion, and an intermediate end portion;

one and only one folding conveyor section having one end hingably attached to the intermediate end portion of the main conveyor section, and having an opposite discharge end portion, so that in a folded position the folding conveyor section is adjacent to the main conveyor section, and in an operative unfolded position it linearly extends the main conveyor section, said folding conveyor section having a length exceeding one half of the length of the main conveyor section;

a continuous driven belt encircling the conveyor sections;

a wheeled support means having a frame, a telescoping arm having one end portion hinged to the frame and an opposite end portion hinged to the intermediate end portion of the main conveyor section, and a fixed length arm having one end hinged to the frame and an opposite end hinged to the central portion of the main conveyor section, so that when the telescoping arm is in a retracted position the main section of the conveyor is in a generally horizontal position and when the telescoping arm is in an extended position the intermediate end portion is elevated and the main conveyor section is inclined; and, a counterweight positioned on the feed end portion of the conveyor, necessitated by the otherwise unbalanced folding conveyor section, and sized to stably maintain the discharge end of the conveyor in an elevated position when the conveyor is in an operative unfolded position.

2. A conveyor as in claim 1 wherein the folding conveyor section unfolds in a vertical plane, and further comprises a hydraulic lifting means for the unfolding thereof.

3. A conveyors as in claim 2 further comprising a loading hopper positioned above the feed end portion of the conveyor.

4. A conveyor as in claim 3 further comprising a hydraulic landing leg positioned under the feed end of the conveyor, said leg having an extended length when the telescoping arm is in a retracted position and a shorter length when the telescoping arm is in an extended position.

5. A conveyor as in claim 4 wherein the wheeled support comprises two pairs of adjacent wheels in tandem on each side of the conveyor.

6. A conveyor as in claim 1 wherein the conveyor inclination in the operative position may exceed 20 degrees.

7. A conveyor as in claim 6 wherein the conveyor inclination in the most inclined operative position is generally 22–23 degrees.

* * * * *